United States Patent
Burgin et al.

(10) Patent No.: US 10,325,231 B1
(45) Date of Patent: Jun. 18, 2019

(54) INTERRUPTIBLE RESOURCE INSTANCES FOR BLOCK TIME PERIODS

(71) Applicant: AMAZON TECHNOLOGIES, INC., Seattle, WA (US)

(72) Inventors: Joshua Marc Burgin, Seattle, WA (US); Stephen Alden Elliott, Seattle, WA (US); Derek Solomon Pai, Seattle, WA (US); Asem Rustum, Renton, WA (US); Lawrence Wheeless, Redmond, WA (US); Joby Sky Lafky, Seattle, WA (US); Matthew Scott Garman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 891 days.

(21) Appl. No.: 14/869,616

(22) Filed: Sep. 29, 2015

(51) Int. Cl.
*G06Q 10/06* (2012.01)
*H04L 12/911* (2013.01)
*G06Q 20/12* (2012.01)

(52) U.S. Cl.
CPC ....... *G06Q 10/06313* (2013.01); *G06Q 20/12* (2013.01); *H04L 47/70* (2013.01)

(58) Field of Classification Search
CPC . H04L 67/10; H04L 41/5029; H04L 41/5054; H04L 41/5096; H04L 43/0817; H04L 47/781; H04L 47/821; H04L 67/34; G06F 11/34; G06F 9/50; G06F 9/5077; G06Q 30/0283; G06Q 30/08; G06Q 10/06313; G06Q 20/12
See application file for complete search history.

(56) References Cited

U.S. PATENT DOCUMENTS

| | | | |
|---|---|---|---|
| 8,676,621 B1 * | 3/2014 | Helfrich | G06Q 10/0631 705/37 |
| 9,208,032 B1 * | 12/2015 | McAlister | G06F 11/1435 |
| 9,240,025 B1 * | 1/2016 | Ward, Jr. | G06F 9/50 |
| 9,294,236 B1 * | 3/2016 | Ward, Jr. | H04L 1/20 |
| 9,438,529 B1 * | 9/2016 | Kowalski | G06F 9/45558 |
| 9,674,302 B1 * | 6/2017 | Khalid | G06F 9/5077 |
| 9,760,928 B1 * | 9/2017 | Ward, Jr. | G06Q 30/0619 |
| 9,985,848 B1 * | 5/2018 | Ward, Jr. | H04L 41/5045 |
| 10,057,185 B1 * | 8/2018 | Burgin | H04L 47/781 |
| 2006/0155633 A1 * | 7/2006 | Fellenstein | G06Q 10/06 705/37 |
| 2006/0167984 A1 * | 7/2006 | Fellenstein | G06F 9/5072 709/203 |

* cited by examiner

*Primary Examiner* — Alina A Boutah
(74) *Attorney, Agent, or Firm* — Blank Rome LLP

(57) ABSTRACT

Systems and methods permit customers to purchase resource instances on a spot purchasing mode basis, which permits a customer to specify a maximum price that the customer is willing to pay for one or more resource instances (e.g., virtual machine instances running on physical servers). Further, the resource instances purchased under the spot purchasing mode can be guaranteed to run for at least a specified period of time, even if the current variable spot cost value is exceeds the original bid price. Such instances run for defined blocks of time which may be selectable by the customer, thereby providing the customer some level of assurance that the instances will not terminate prematurely due to spot cost value fluctuations. Instances are assigned into a spot block instance pool from other types of pool based on the estimated excess capacity of such other types of pools. The estimate of excess capacity is based on statistical analysis of the usage of the instances.

20 Claims, 9 Drawing Sheets

INTERRUPTIBLE RESOURCE INSTANCES FOR BLOCK TIME PERIODS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers have increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Operators of provider networks try to avoid having unused virtual resources. Some virtual resources may be reserved for exclusive use by the customer, while other virtual resources are purchased on an on-demand basis (i.e., when needed). Service providers generally want to ensure that they have enough virtual resources available to satisfy all of their customers' needs, but doing so is problematic due to the somewhat unpredictable nature of customer needs, unplanned outages of certain virtual resources, physical servers, or even entire data centers. Consequently, service providers generally provide an excess of virtual resources relative to what customers will actually need. The excess helps to ensure that all customers are able to acquire whatever virtual resources they need when they need them. However, providing excess virtual resources adds cost to the service provider in the form of excess, but non-revenue generating, virtual resources.

BRIEF DESCRIPTION OF THE DRAWINGS

For a detailed description of various examples, reference will now be made to the accompanying drawings in which.

DETAILED DESCRIPTION

Figure 1:
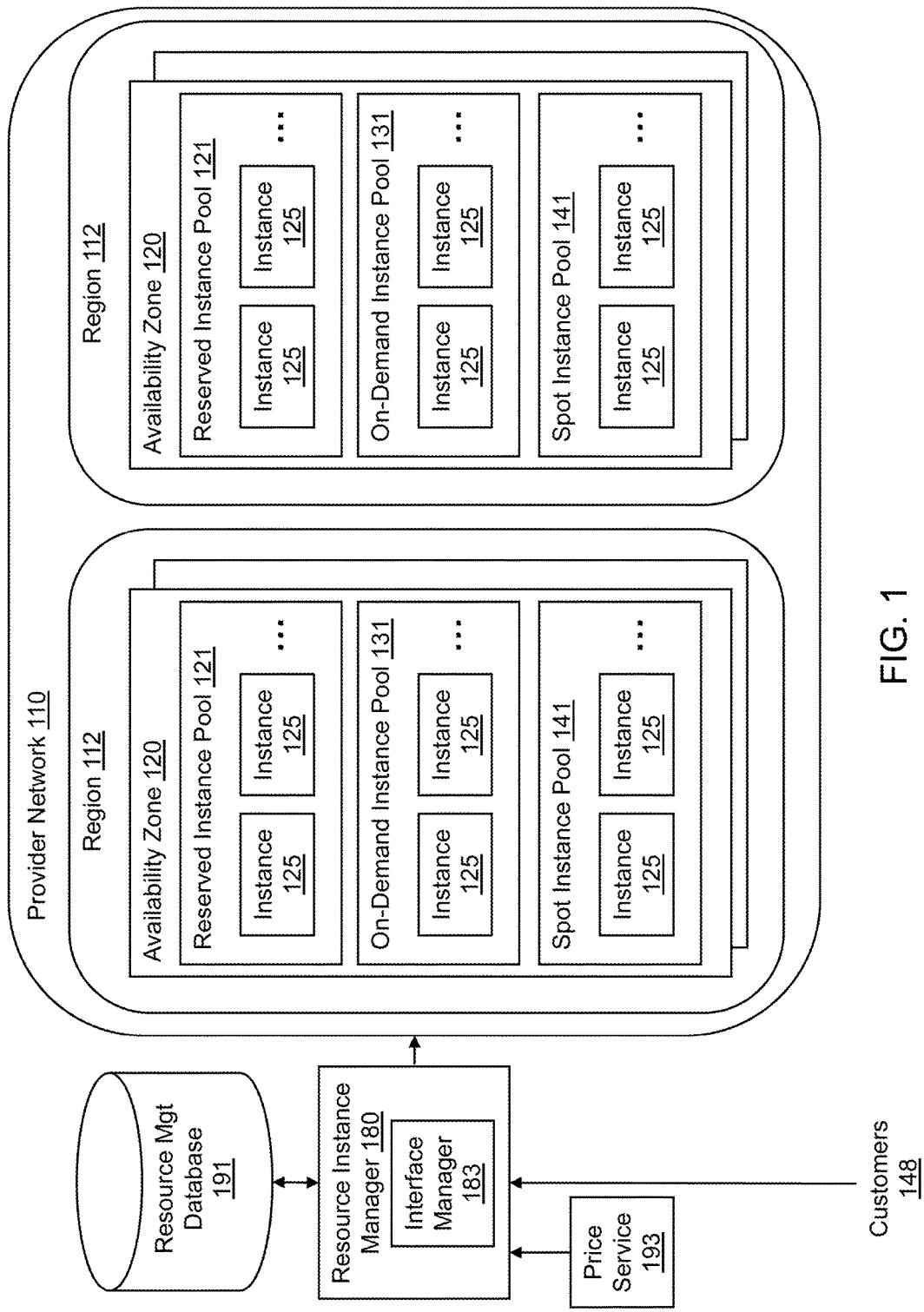
FIG. 1 illustrates a provider network for implementing blocks of spot instances in accordance with various examples.

Various embodiments are described of methods and apparatus for providing otherwise interruptible resource instances (e.g., virtual machines running on physical servers) for use by customers of a service provider for defined periods of time in response to requests from the customers for the resource instances. The defined period of time where the interruptible resource will not be interrupted by the service provider is referred to as a "block." Networks set up by an entity such as a company or a public sector organization to provide one or more services (such as various types of cloud-based computing or storage) accessible via the Internet and/or other networks to a distributed set of customers may be termed "provider networks" in this document. A provider network may include numerous data centers hosting various resources, such as collections of physical and/or virtualized computer servers, storage devices, networking equipment and the like, needed to implement and distribute the infrastructure and services offered by the provider. The resources may in some embodiments be offered for reservation by (and allocation to) customers in units called "resource instances," such as virtual or physical compute instances or storage instances. A virtual compute instance may, for example, be allocated resources from one or more servers such as computational capacity (e.g., a particular type and number of central processing units (CPUs), an amount of main memory, storage device number and size, etc.) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

Operators of such provider networks may permit customers to purchase the use of resource instances in accordance with a variety of purchasing modes. Examples of purchasing modes include a long term reservation mode, an on-demand mode, an interruptible price mode, and an interruptible block mode. In the long term reservation mode, a customer may make a low, one-time upfront payment for a resource instance, reserve it for a specified duration such as a one or three year term, and pay a low hourly rate for the instance. The customer will be assured of having the reserved instance available for the term of the reservation. Using the on-demand mode, a customer can pay for capacity by the hour (or some other appropriate time unit), without any long-term commitments or upfront payments.

In the spot price mode, a customer can specify the maximum price per unit time that the customer is willing to pay for a particular type of resource, and if the customer's maximum price exceeds a variable spot price determined at least in part by supply and demand, that type of resource would be allocated for use to the customer. The spot price mode permits a customer to obtain one or more single resource instances. An interruptible instance assigned to a specific customer may be interrupted when that instance's current variable price exceeds the maximum price. That is, customers may purchase the use of interruptible instances and such pricing may be lower than other purchase modes (at least in part because the customer is able to specify the maximum acceptable price), but the interruptible instance may be terminated if the variable price for that instance exceeds the customer's maximum price.

Some customers may like the lower price of interruptible instances (as compared to on-demand or reserved instances) but may be somewhat intolerant of the interruptible nature of interruptible instances. The disclosed embodiments, therefore, provide for "blocks" which are interruptible instances that will not be interrupted for a predetermined period of time if a variable interruptible block price equals or is less than a bid price set by the customer. The block period of time may be dictated by the service provider or the service provider may offer multiple different time periods for the customer to select. In some embodiments, the selectable block of time is in one hour increments from 1 to 6 hours. For example, if the customer chooses a 2-hour block as part of his spot block request, that customer will be granted use of the instance for 2 hours, if the instance's current variable spot block price equals or dips below the customer's bid price. At the end of the 2-hour block of time, the instance may be deactivated. The variable block price also may be referred to herein as a "variable price" or "variable cost value." The variable block price may be the same as or different from the variable spot price used to determine whether to launch interruptible instances.

Various end of block options are available which specified the provider network behavior at the end of the block. Such options may be selectable by the customer including one-time, one-time with auto-renew, persistent, and persistent with auto-renew. A one-time block automatically terminates at the end of its predetermined period of time. If the one-time with auto-renew termination option is selected, the spot block request will be re-evaluated near the end of the time period associated with the block. If the request re-evaluation grants an instance, the same instance will keep running for a renewed block of time; otherwise, the instance is terminated. If the persistent end of block option is selected, the spot block will terminate at the end of its block period of time, but the customer's spot block request will again be evaluated for institution of another spot instance for a new spot block. This process will repeat until a "valid to" date/time is reached, after which the spot block request will be deactivated and thus no longer be evaluated. If the persistent with auto-renew option is chosen, near the end of a spot block, the spot block request is re-evaluated. If the request re-evaluation grants an instance, the currently running instance will be permitted to continue running for a new block of time. If the request re-evaluation does not permit an instance to be granted (e.g., the current variable spot block price is greater than the bid price), the instance will be terminated and the request will subsequently be re-evaluated until a valid to time is reached.

Spot blocks can be used by any customer, and may provide significant value to customers who are flexible as to when their instances start and have short-running jobs (e.g., several hours or less) that must run to completion. For example, it may be known that a particular video transcoding job may never take more than 1 hour to complete but the particular start time for the job is not important. Rather than starting the video transcoding job on an on-demand instance, a spot block request can be submitted for a 1-hour spot block specifying a maximum spot block price of, say, 75% of the on-demand price. A 1-hour spot block will be granted to the customer once the bid price meets or exceeds the current spot block price.

In some embodiments, the usage of resource instances from non-spot related instance pools (e.g., on-demand instance pools, reserved instance pools, etc.) are analyzed to estimate the number of instances from such pools that are likely to be unused for varying block periods of time. The estimated number of unused instances for each block period of time may be computed for different confidence values (e.g., also called a confidence interval). For example, at a 50% confidence value, the system may estimate that 120 resource instances will otherwise be unused for the next 2 hours, while at a 90% confidence value, only 45 instances will likely be unused during the same 2 hour block period of time. An estimated number of unused instances for a given confidence value may be assigned from an on-demand instance pool (or other non-spot related pool) to the spot block pool. The system can populate the spot block pool with different length spot blocks based on the estimated number of resource instances from the other instance pools.

FIG. 1 illustrates a system environment in accordance with at least some embodiments. The system 100 includes a provider network 110 comprising a plurality of geographical regions 112. Each geographical region 112 may include one or more availability zones 120. An availability zone may also be referred to as a logical data center that maps to one or more physical data centers. Each availability zone 120 in turn may include a plurality of servers configured to host resource instances 125. A resource instance may be a virtual machine which runs on a physical server. The servers may be organized into various resource pools in some embodiments, such as a reserved instance pool 121, an on-demand instance pool 131, and a spot instance pool 141. The various resource instances 125 in the different availability zones 120 may be reserved and/or allocated for use by customers 148 (e.g., customers of the operator of the provider network 110). Although the instances 125 illustrated in FIG. 1 are shown as belonging to availability zones 120, in other embodiments the provider network 110 may be organized differently: e.g., in some embodiments availability zones may not be implemented. Instance pools may be implemented within availability zones in some implementations (e.g., each availability zone may have its own reserved instance pool), while in other implementations an instance pool or sub-pool may span multiple availability zones.

In the illustrated embodiment, system 100 includes a resource instance manager 180 operable to perform a variety of operations in response to requests submitted by customers 148. An interface manager component 183 of the resource instance manager 180 may in some embodiments implement one or more programmatic interfaces allowing customers 148 to submit requests for resource instances 125 of the various pools 121, 131, 141. For example, the interface manager 183 may receive a request for a spot block from a customer 148. The resource instance manager 180 processes the spot block request and attempts to satisfy the request for the customer from one or more of the spot instance pools 141 per the requirements encoded into the spot block request itself as explained below. The interface 183 implemented by the resource instance manager 180 also may support a variety of other functionality such as allowing customers to cancel or modify a currently running spot block request, terminate a currently running spot block instance, and so on.

FIG. 1 also shows a resource management database 191 which in some embodiments may include an identity of each resource instance 125 currently running on behalf of each customer. The information in the resource management database 191 may indicate which spot blocks are active for each customer (e.g., as identified by a spot block identifier) and the number and type of resource instances operating within each such spot block.

A price service 193 is also shown and is accessible to the resource instance manager 180. The price service 193, which may be implemented on a computing device such as a server, updates and stores the current, but variable spot and spot block prices of the various spot instances. Such prices are subject to the effects of supply and demand and may be updated periodically (e.g., once per hour, once per day) or in a non-periodic manner. The variations in spot and spot block prices generally are much more frequent than changes to the prices of on-demand or reserved instances. The spot and/or spot block price for a given spot instance pool 141 can be requested by the resource instance manager 180 and supplied to the resource instance manager 180 the price service 193.

Each instance pool 121, 131, and 141 may have associated resource management and pricing policies which govern, for example, whether a reservation or allocation of a resource instance can be interrupted, whether reservations of one customer can be resold to another, the different types of static and dynamic pricing rates in effect for instances of the pool, and so on. The various types of instance pools 121, 131, 141 may be the same or different between the various availability zones 120 within a region 112 and may be the same or different between the different regions. The pools may represent logical collections or aggregations. For example, the presence of two instances in the same pool or sub-pool may not necessarily imply anything about the physical location of the hardware used for the two instances.

The reserved instance pool 121 includes resource instances that may be reserved by customers 148 for fairly long periods of time, such as one-year terms, three-year terms, etc. by paying a low, one-time, upfront payment for the resource instance, and then paying a low hourly rate for actual use of the instance at any desired times during the term of the reservation. Thus, the customer 148, by making the long-term reservation, may be assured that its reserved instance will be available whenever it is needed. If a customer 148 does not wish to make a long-term reservation, the customer may instead opt to use on-demand instances from the on-demand instance pools 131. The pricing policy for the on-demand instance pools 131 may allow the customer 148 to pay for resource capacity by the hour with no long-term commitment or upfront payments. The customer 148 may decrease or increase the resource capacity used, based on application needs, and may only pay the hourly rate for the instances used. In some cases the per-hour pricing for on-demand instances may be higher than the hourly rate for reserved instances, because the relatively long durations of reservations may provide a more stable revenue stream to the operator of the provider network than the potentially more dynamic revenue stream provided by on-demand instances.

The spot instance pools 141 provide another type of resource purchasing and allocation model. The price of instances in a given spot instance pool 141 varies with supply and demand effects. Instances from any of the spot instance pools 141 can be purchased for a guaranteed maximum price in that the customer specifies the maximum price (the "bid price") that the customer is willing to pay. If the bid price equals or exceeds the current spot price for a desired instance, the instance is activated and assigned for exclusive use by the customer. Thus, the customer knows the upper limit that he will have to pay for a given spot instance. However, spot instances are interruptible in that the spot price may eventually exceed the bid price. If and when that happens, the spot instance is terminated from use by the customer.

As an alternative to standard spot instances, customers can obtain spot instances on a block basis as noted above. A spot block provides the customer an instance for a guaranteed period of time regardless of the spot block price during that time period. That is, even if the spot block price increases above the bid price during the spot block period of time, the instance will still run on behalf of the customer for at least the remainder of the block period of time. The price the customer pays for the spot block is the spot block price in place when the resource instance manager 180 evaluates the spot block request to determine that a particular spot instance satisfies the customer's request. Further, for spot blocks, rather than specifying a bid price to acquire use of a single spot resource instance, the customer can specify a bid price for a plurality of resource instance (i.e., a fleet of spot instances), and can even specify different bid prices for different types of instances.

In some embodiments, the spot instance pool 141 may include both spot instances and spot block instances. Alternatively, spot instances may be populated into a spot instance pool, while spot block instances are populated into a separate spot block instance pool. At any rate, the resource instances that are populated into the spot instance pool for offering to customers as spot blocks generally represent unused resource instances from other pools, such as the on-demand instance pool 131 and/or the reserved instance pool 121. Because spot blocks are offered for defined periods of time (e.g., 1 hour, 2 hours, etc.), the resource instance manager 180 not only determines the number of resource instances that are currently unused in the non-spot related pools, but also the likelihood that such instances will remain unused for varying block periods of time. For example, the resource instance manager 180 may determine that 0.5% of the total number of resource instances in the on-demand instance pool 131 are likely to be unused for a 6-hour block of time, that 1.1% are likely to be unused for a 5-hour block of time, that 7.5% are likely to be unused for a 4-hour block of time, that 15% are likely to be unused for a 4-hour block of time, that 19% are likely to be unused for a 3-hour block of time, and that 29% are likely to be unused for a 1-hour block of time.

These estimates may be determined using any suitable statistical modeling technique. The resource instance manager 180, in part, is responsible or causing resource instances to be launched and terminated and timestamps each time an instance is launched and each time the instance is terminated. The resource instance manager 180 can use this information, and information such capacity of the servers configured to execute resource instances, to develop a usage history of the server fleet. A usage history thus can be stored in the resource management database 191. The usage history for each resource instance indicates server capacity and when the resource instance was used over a given period of time such as a week, a month, a year, etc. The usage history of the servers and resource instances in the on-demand instance pool (or other non-spot related pools) is provided to the resource instance manager 180 in order to perform a statistical analysis to estimate the number of resource instances from the on-demand pool that are likely to be unused for each of the block periods of time. The statistical analysis may include linear regression and/or other statistical techniques based on the historical usage data of the various instances to provide a prediction of the number of unused resource instances to assign to the spot instance pool on a block basis. For example, the resource instance manager 180 can be programmed to use linear regression to fit a model that predicts server utilization over time. In this example, the inputs to the model can be server utilization (that takes into account different server configurations to host different instance types over time and price associated with the interruptible instances). The output of the model is a prediction of unused server capacity, or put another way unused instances (since unused server capacity maps to unused instances).

A confidence value also may be computed for each unused instance estimate by constructing a confidence intervals for the model for different percentiles. For example, the resource instance manager 180 may estimate that, at a 50% confidence value, 120 resource instances will be unused for the next 2 hours, while at a 90% confidence value 45 instances will likely be unused during the same 2 hour block period of time. Thus, multiple estimates of unused resource instances for each block period of time are generated, with each estimate corresponding to a confidence value. Confidence intervals may be computed from the linear regression model that is fit to the data. For example, a confidence value may be computed as the variance or standard deviation of the data input into the model. Other statistical measures of how well the linear regression model fits the data can be used as well as the confidence intervals.

An input to the resource instance manager 180 may be a confidence value for each of the block periods of time. In response, the estimated number of unused instances for a given block period of time and for the specified confidence value may be assigned from the on-demand instance pool (or other non-spot related pool) to the spot block pool. The system can populate the spot block pool with different length spot blocks based on the estimated number of resource instances from the other instance pools. For example, the resource instance manager 180 might decide to create a 4-hour spot block if the confidence interval is relatively high that a certain number of unused instances will remain unused for a particular 4-hour block of time, but might decide not to create the 4-hour block if the confidence interval is relatively low. Further, the pricing of the blocks may be related to the confidence interval.

A defined time schedule also may be computed for each block period of time. For example, 25 instances likely may be unused (and thus available to assign to the spot pool 141 for spot block purposes) for offering in 6-hour spot blocks between 8 AM and 6 PM Monday through Friday, but 75 instances are available for 6-hour spot blocks between 6 PM and 8 AM Monday through Friday. Further, the defined time schedule may specify that 125 instances are available for 6-hour spot blocks from 6 PM Friday through 8 AM Monday morning. Different schedules may be computed for each of the various block periods of time.

Figure 2:
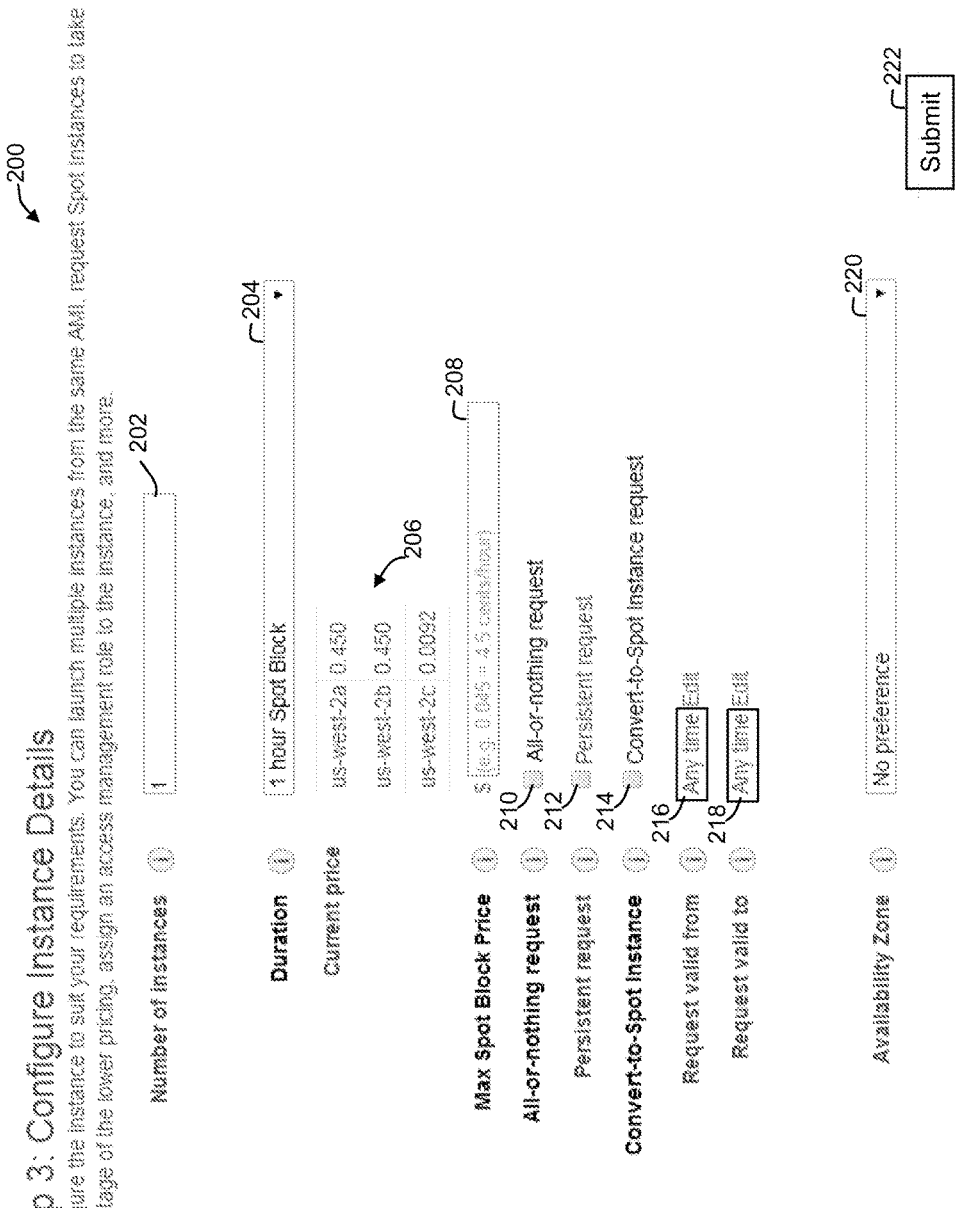
FIG. 2 shows a graphical interface by which a customer can submit a request for a spot block in accordance with various examples.

FIG. 2 shows an example of a user interface 200 implemented, for example, by the interface manager 183 of the resource instance manager 180 to allow a customer to submit a request for a spot block. The user interface 200 can be used by a customer to request a single spot instance under a pricing plan in which the instance is interruptible due fluctuations in the spot price, or one or more spot instances under a spot block pricing plan in which the spot request, if granted, provides spot instances for a minimum block of time.

At entry field 202, the customer can enter an integer number of instances to be included in the request. The number "1" is shown in the example of FIG. 2 meaning that the user is requesting only a single instance. A number greater than 1 can be specified as well. A value of "0" is considered invalid, and an upper limit may be imposed as well on the number of instances specified in the request.

Entry field 204 permits the customer to specify a block time duration for the instance. In the example shown, the customer has specified a time duration of 1 hour. Based on the value of 1 in entry field 202 and the 1-hour time block specified in entry field 204, the customer has requested a 1-hour spot block meaning that the customer wants a single spot instance guaranteed to last for one hour (regardless of the fluctuations in the spot block price for that instance during that one hour block of time). The spot block time duration may be specified in integer multiples of one hour, or in fractional hour increments. In some embodiments, the spot block time duration may be limited by the service provider to being between a minimum value and a maximum value, such as from 1 to 6 hours.

Information data 206 provides current spot prices of instances in various availability zones. The spot price currently for two of the zones is $0.45/hour while the third zone has a spot price of $0.0092/hour. These prices will fluctuate as the spot prices fluctuate. The prices in information data 206 may be helpful to the customer when determining a suitable bid price. Entry field 208 permits a customer to specify a maximum spot block price (i.e., the bid price) in units of, for example, dollars (or cents) per hour. The bid price represents the maximum price per hour that the customer is will to pay for each instance. In some embodiments, the customer's bid price must be between lower and upper limits.

A customer can specify the number of instances to be created in the spot block request in entry field 202. If that number is two or greater, the customer has two options for the all-or-nothing entry field 210. If the all-or-nothing field is selected, then the customer only wants the customer-specified number of spot instances to be created if the resource instance manager 180 can activate the complete number of instances relative to the bid price. For example, if the customer specifies in field 202 that he wants 100 instances and does not want any of those instances to be launched on his behalf unless all 100 instances can be launched, then the customer selects the all-or-nothing field 210. With that field selected, all 100 requested instances will be launched if the system can successfully find 100 suitable spot instances given the bid price and the current spot for such instances. If fewer than 100 instances match the criteria in the spot block request, none of the instances will launch. However, if the customer is willing to operate with fewer than the number of instances specified in entry field 202, then the customer should not select the all-or-nothing entry field 210, and the resource manager 180 will launch as many as possible of the requested number of instances that match the pricing requirements.

The persistent request field 212 permits the customer specify a behavior of the system at the end of the block of time. If the persistent request option is selected by the customer, upon expiration of the block of time, the instance is terminated. The resource instance manager 180, however, will re-evaluate the spot block request to determine whether a new instance can be launched for a new block of time. That is, if the current spot block price is still below the bid request entered via the maximum spot block price entry field 208, the resource instance manager 180 will launch a new instance for another block of time.

If the customer selects the convert-to-spot instance field 214, upon the end of the spot block time, the instance will automatically convert the purchasing mode of the spot block resource instance to a regular spot instance. This means that the converted spot instance will not be guaranteed to run for any particular period of time, and will be susceptible to immediate termination if at any time the current spot block price exceeds the customer's bid price.

Other end of block options can be implemented as well in the user interface 200, but are not shown in FIG. 2. For example, a convert-to-on-demand instance option will, if selected, convert the purchasing mode of the spot block resource instance to an on-demand instance purchasing plan once the current spot block expires. Another end of block option that may be provided is an auto-renew option which causes the spot block request to be re-evaluated shortly before the end of the spot block to determine if the instance should be renewed, without interruption, for another block period of time. Both the auto-renew and persistent options can be selected at the same time. In that case, the currently running spot instance will be renewed for an additional block of time on a repeating basis (assuming the spot block price is equal to or below the bid price each time the request is re-evaluated). If the auto-renew option is selected but not the persistent option, then the spot block will only be renewed one time (one time with auto-renew). If neither the auto-renew nor persistent options are selected by the customer, then the resource instance simply is deactivated at the end of its spot block (one-time).

A "valid from" and "valid to" time can be specified by the customer in entry fields 216 and 218. The valid from/to times can be specified as dates, times or date and time. The "valid from" time specifies the time before which the resource instance manager should not evaluate the spot block request. Thus, no spot blocks will be created before the "valid from" time. The "valid from" time may be specified to be at a time that is later than then the time the customer submits the spot block request. For example, the valid from time may be a date that is two weeks after the time the request was made. The "valid to" time specifies a time at which the resource instance manager stops evaluating the spot block request. If a spot instance happens to already be running in a spot block when the "valid to" time is reached, that instance will be permitted to continue to run but no more spot blocks will be created once the currently running spot instance terminates regardless of whether the auto-renew and/or persistent end of block options are selected. The customer can specify "any time" (or equivalent) in the valid from/to fields 216, 218 to indicate the customer's intention not to have a valid from or to time. Absent a valid "valid from" time, the resource instance manager 180 begins to evaluate the spot block request as soon as it receives the request. Absent a valid "valid to" time, the resource instance manager 180 continues to re-evaluate the spot block request until the request is otherwise cancelled by the customer.

Entry field 220 permits a customer to select one or more particular availability zones 120 for consideration of launching spot blocks. If the customer has no particular preference for an availability zone, the customer can select "no preference" (or equivalent) from a drop down menu. A submit button 222 may be provided to cause the resource instance manager 180 to create spot blocks in accordance with the parameters (e.g., number of instances, bid price, etc.) defined in the request submitted by the customer 148. Specific instance types also can be selected by the customer via an entry field that can be added to the user interface embodiment of FIG. 2. Further still, different bid prices can be imposed by the customer for different instance types.

The following is an example of a spot block fulfillment and pricing scenario. In this example, the customer submits a spot block request at 06:00 for 20 two-hour, all-or-nothing, instances of a particular type at a bid price of $0.05. The following table shows a timeline for this example:

| Time | Spot Block Price | Capacity Available? | Charged | Status |
|---|---|---|---|---|
| 06:00 | $0.06 | | $0.00 | The spot block request remains open because the current spot block price of $0.06 is greater than the bid price of $0.05 |
| 06:17 | $0.05 | No | $0.00 | The spot block request remains open even though the current spot block price of $0.05 is equal to the bid price of because we the resource manager does not have available the full allotment of the 20 specified resource instances |
| 06:43 | $0.04 | Yes | $0.04 × 20 | The spot block request is fulfilled at a rate of $0.04 per hour for two hours for each of 20 instances |
| 07:43 | $0.06 | | $0.04 × 20 | Even though the price for 2-hour spot blocks has risen, the spot blocks are still charged $0.04 per hour |
| 08:43 | $0.06 | | $0.00 | The two-hour spot block expires and the instances are terminated |

Figure 3:
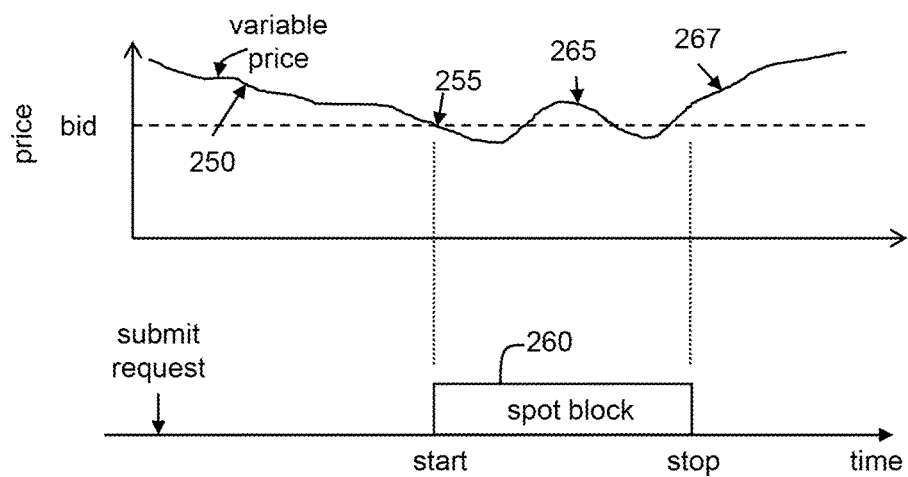
FIG. 3 illustrates a timeline in which a spot block is created in accordance with various examples.

FIG. 3 shows an example of the creation of a spot block. The variable spot block price is shown relative to the bid price specified in the spot block request. In the timeline shown, at 250 the spot block price is above the bid price and thus the resource instance manager 180 has not launched a spot block. At 255, the spot block price has fallen to equal the bid price. At that moment, the resource instance manager 180 launches a spot block as shown at 260. The start time for the spot block generally coincides with the spot block price equaling the bid price. The spot block lasts for the block time specified by the customer in the request. The instance can be used by the customer during the entire block of time despite the spot block price rising above the bid price at 265 and 267. The instance terminates in this example at the end of the spot block time period.

A spot block is said to be "guaranteed" to operate on behalf of the customer for the entire block period of time. In some embodiments, it is possible that a spot block may be prematurely interrupted by the provider network. A premature interruption might occur if, for example, there are an insufficient number of instances in another pool such as the on-demand instance pool 131. It is expected that prematurely interrupting a spot block will rarely, if ever, occur, but it may be possible in some embodiments. Any reference to the spot blocks being guaranteed for the spot block period of time takes into account the small possibility of interruption due to insufficient resources in another pool of resource instances.

Figure 4:
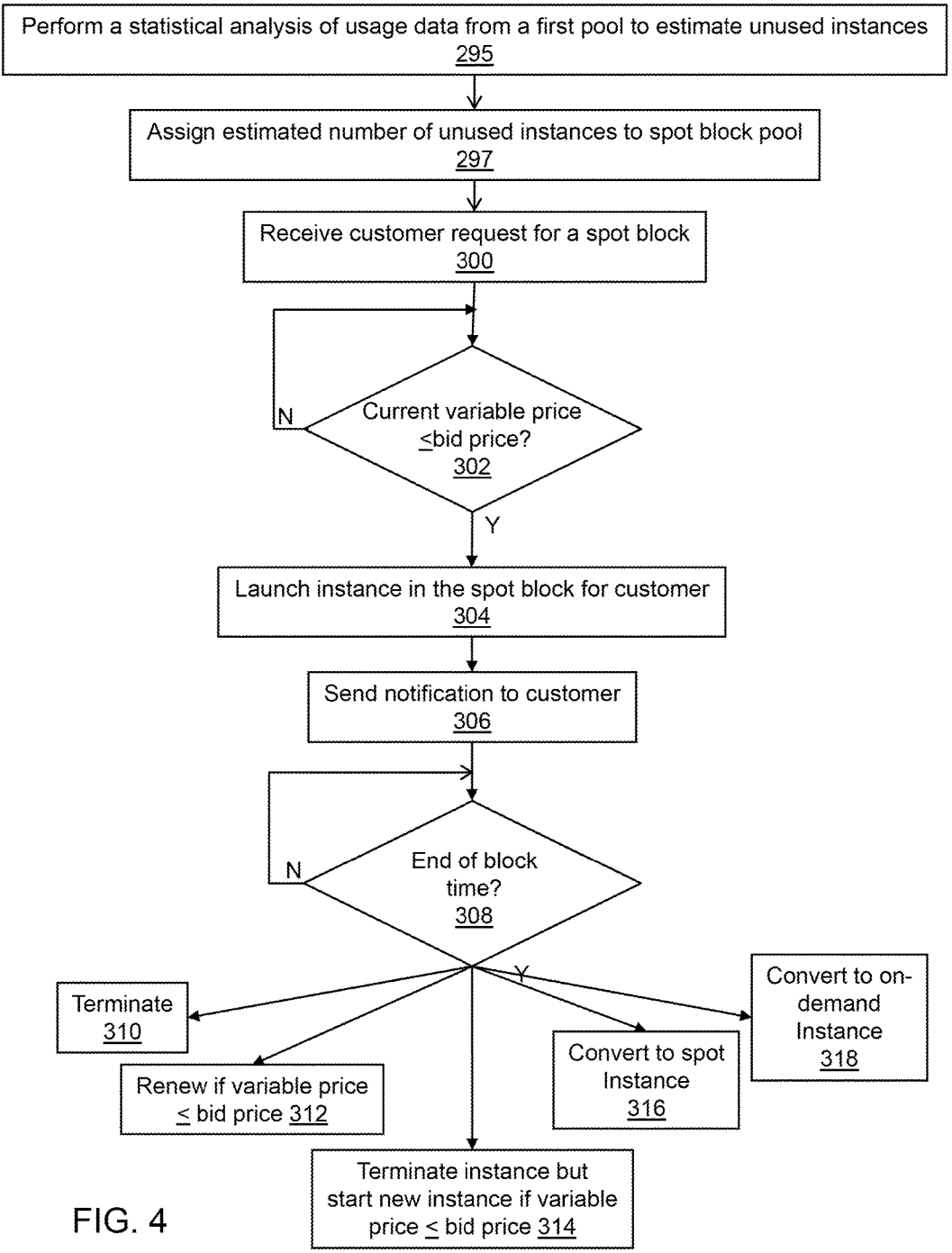
FIG. 4 shows a method for generating a spot block in accordance with various examples.

FIG. 4 shows a flow diagram for a method in accordance with some embodiments. The various operations depicted can be performed in the order shown, or in a different order. Further, two or more of the operations may be performed in concurrently rather than sequentially as shown. The operations may be performed by the resource instance manager 180.

At 295, the method includes, for each of at least some, of not all, of the multiple block periods of time, estimating (e.g., via a statistical analysis technique), a number of resource instances during that particular block period of time that are unlikely to be unused. The estimated number of unused resource instances for each block period of time may be computed in accordance with a confidence value as noted above. Multiple confidence values may be included for each block period of time, and thus multiple estimates of unused resource instances may be computed for each block period of time—one estimate for each confidence value.

At 297, the method includes assigning resource instances to an interruptible pool of resource instances based on at least one of the estimated numbers of unused resource instances. For example, the resource instance manager 180 may assign resource instances from the non-spot related instance pools (e.g., the on-demand instance pool 131) to the spot instance pool 141 for offering to customers as spot blocks. Data inputs to the resource instance manager 180 may include a confidence value for each block period of time, a minimum and/or maximum number of resource instances to be included in a particular spot block period of time, planned outages of the non-spot instance pools, etc. The planned outages may include a schedule that certain instances or physical servers on which such instances run are to be deactivated for maintenance or replacement. A planned deactivation of various instances may mean that fewer instances will be unused during the maintenance period of time than otherwise might have been estimated based on the statistical model.

At 300, the method includes receiving a customer request for a spot block. The request may be received from the customer via the interface manager 183 of the resource instance manager 180. The request may be provided in the form of a HyperText Markup Language (HTML) file or other suitable form. The request may include various parameters pertaining to the customer's desire for a spot block. Such parameters may include the number of instances to be launched in a spot block, the length of time of the spot block, the bid price, the types of instances (not specifically shown in the user interface example of FIG. 2), a "valid from" time, a "valid to" time, one or more availability zones, one or more regions (not shown in FIG. 2), end of block options such as persistent, all-or-nothing, etc.

At 302, the resource instance manager 180 determines whether the current variable price (i.e., the spot block price) is less than or equal to the bid price. If a particular type of instance, or a particular availability zone, was specified in the request, the current variable for the specified instance type or instance from the specified availability zone is compared to the bid price. This decision may be performed immediately or only upon reaching the "valid from" time (if one was specified). If the current variable price is greater than the bid price, no instances are launched and control loops back to decision 302. That is, whether the variable price is less than or equal to the bid price is repeatedly made (e.g., once per minute, once per hour, etc.) until the resource instance manager 180 determines that the variable price is less than or equal to the bid price.

Control reaches operation 304 upon a determination that the variable price is indeed less than or equal to the bid price. At 304, the method includes launching an instance into the spot block for the customer. The spot block may include the desired type of instance and/or one from a desired availability zone or region running on behalf of the customer for the request-specified block period of time. A notification may be sent to the customer 306 indicating that the request instance has been granted to the customer. The notification may be in the form of a pop-up window, an email message, a text message, an audible tone, or other suitable type of notification. Launching the instance may include starting whatever applications the customer may have pre-designated for the spot block. Alternatively, the customer may manually access the spot block instance and run whatever job the customer so chooses. The notification informs the user when he or she can actually use the instance.

At 308, the resource instance manager 180 determines whether the end of the block time has been reached. If it has, then one of multiple operations may be performed at the end of the block time in accordance with end of block options that the customer may have specified in the spot block request. One option (310) is to have the spot instance terminate at the end of the spot block with no possibility of a renewal or launch of a new spot block instance.

Another option is that, rather than terminating the spot instance at the end of the spot block time, the instance may automatically renew (312) for an additional block time but only if the variable price at the end of the current spot block is less than or equal to the bid price. The auto-renewal option may be configured to occur only once or may occur more than once. For example, if the "persistent" request field 212 is selected (FIG. 2), the auto-renewal option causes each spot block to automatically renew for an additional spot block time as long as the variable price is less than or equal to the bid price and, if specified, the "valid to" time has not been reached.

Another end of block option (314) is that the current spot instance is terminated at the end of the spot block, but the resource manage 180 determines whether another spot instance is available that has a variable price that is less than or equal to the bid price and that otherwise comports with the requirements of the spot block request. If such as spot instance is available, it is launched by the resource instance manager 180 to take the place of the recently terminated spot instance.

Yet another end of block option (316) is that spot instance of the spot block which has ended is converted to a regular (i.e., non-spot block) spot instance. This option is shown as selection field 214 in FIG. 2. In this case, the spot instance continues to run until the variable price is above the bid price, at which time the instance is terminated. Converting the spot block instance to a regular spot instance includes changing the pricing model for the instance from one in which the price is fixed based on the variable price at the beginning of the spot block to a pricing model that may fluctuate with the variable price, at least until the bid price is reached.

Instead of converting the spot block instance to a regular spot instance, the purchasing mode for the instance can be converted to a purchasing mode for an on-demand instance (318). Under the on-demand purchasing mode, the price the customer pays for the instance is tied to the on-demand pricing for the instance and is generally a fixed price, not to a bid price submitted by the customer. As an on-demand instance, the customer is given exclusive use of the instance for as long as the customer wants it.

Figure 5:
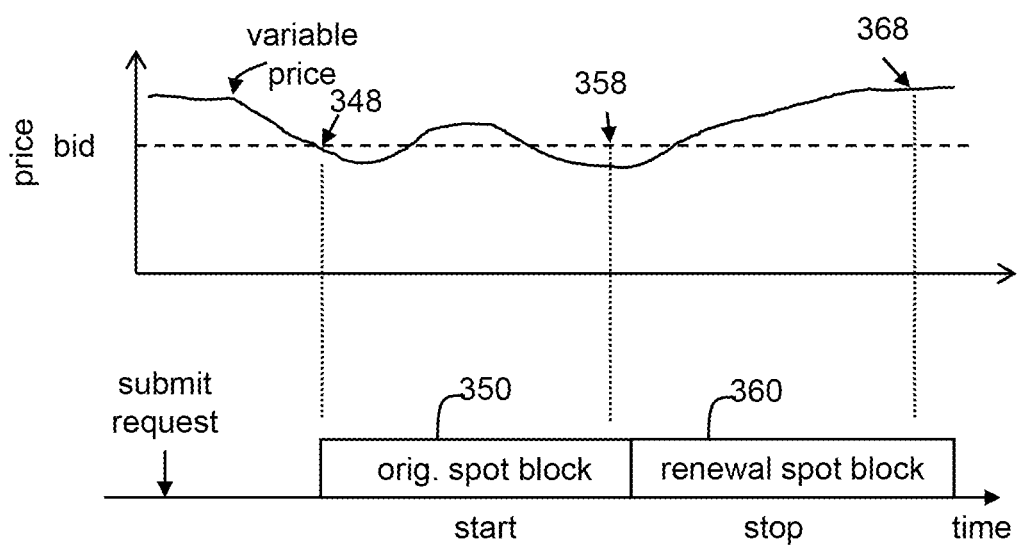
FIG. 5 illustrates another timeline in which a spot block is created and then renewed in accordance with various examples.

FIG. 5 shows an example of a first spot block 350 (designated as the "original" spot block) which was created by the resource instance manager 180 and assigned to a particular customer based on the variable price falling to the bid price at 348. As explained above, the original spot block 350 endures for the spot block time regardless of fluctuations in the variable price relative to the bid price. In this example, the spot block request specified an end of block option of "persistent" (election field 212 in FIG. 2). As a result of the election of "persistent" by the customer, at 358 and just before the end of the original spot block time, the resource instance manager 180 re-evaluates the spot block request to determine if the instance currently run in the spot block can continue to run. This re-evaluation process includes comparing the bid price from the spot block request to the current variable price. As can be seen in the example of FIG. 5, the bid price at 358 is greater than the variable price. Consequently, the currently running instance is renewed for an additional ("renewal") spot block time as indicated at 360. Renewing the instance means that it continues to run without interruption on behalf of the customer. The re-evaluation of the spot block request at 358 occurs just before the original spot block time expires. The re-evaluation may occur at a defined period of time before the expiration point such as one minute, 10 minutes, etc. before the original spot block time expires.

Near the end of the renewal spot block time (368), the resource instance manager 180 again re-evaluates the spot block request to determine if the instance should be renewed for yet another spot block period of time. At 368, the current variable price is greater than the bid price and thus the instance is not renewed for an additional spot block period of time. The instance is terminated at the end of the renewal spot block 360.

In some embodiments, the spot block is automatically renewed by the resource instance manager 180 as long as the variable price is below the bid price. In other embodiments, the resource instance manager 180 attempts to renew the spot block only once. With a one-time renewal option, the instance terminates automatically at the end of the original spot block if the variable price is above the bid price at the time the resource instance manager 180 re-evaluates the spot block request, or terminate after the renewal spot block (if the renewal was granted) without regard to whether the variable price is below the bid price when the spot block request is evaluated near the end of the renewal spot block.

Figure 6:
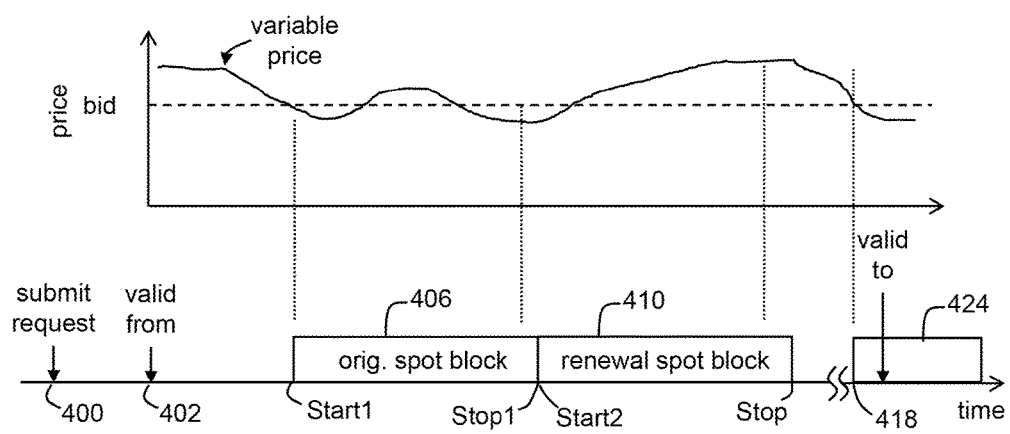
FIG. 6 shows yet another timeline in which a spot block is created and then renewed and another spot block is created just before a "valid to" occurs and terminates after the valid to time in accordance with various examples.
Figure 7:
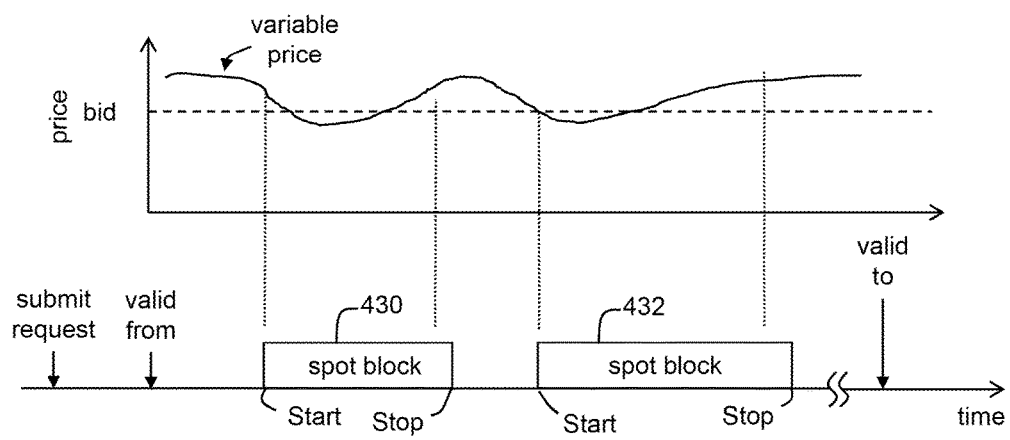
FIG. 7 shows yet another timeline in which several spot blocks are created in accordance with various examples.
Figure 8:
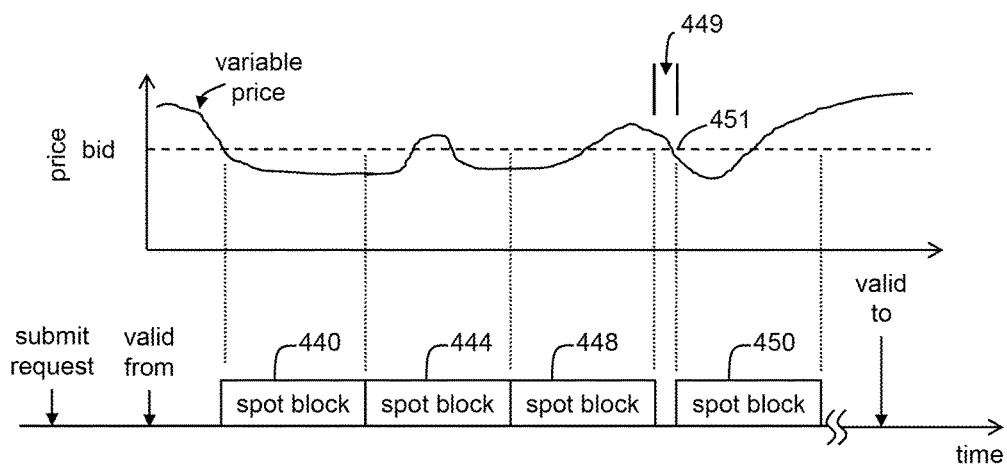
FIG. 8 shows a timeline in which several spot blocks are created and serially renewed in accordance with various examples.

FIGS. 6-8 show examples which include the use of the "valid from" and "valid to" times. In the example of FIG. 6 a spot block request is submitted at 400 along the timeline. The spot block request includes a valid from time that coincides with 402 on the timeline (a time that is later than the request submission time). The valid from time may specify the day following the day the request was submitted, two days later, a week later, etc. The spot block request will not be evaluated until the valid from time is reached. The relationship between the variable price for the type(s) of spot instance specified in the request is shown in FIGS. 6-8.

The resource instance manager 180 begins to evaluate the spot block request at the valid from time. The resource instance manager 180 may evaluate the request at regular time intervals (once per minute, once every 10 minutes, etc.) until the resource instance manager determines that the current variable price is equal to or below the bid price. In the example of FIG. 6, the resource instance manager 180 determines that the variable price is equal to or below the bid price at START1 along the time line. The original spot block 406 begins at that time and lasts for the spot block time period provided in the spot block request. The original spot block 406 thus has an ending point defined by STOP1. The instance will be terminated at STOP1 unless the instance is renewed, which is the case in FIG. 6. The instance is renewed as spot block 410 because the variable price is determined to equal to or less than the bid price at or near STOP1. Spot block 410 extends from START2 to STOP2. The STOP1 and START2 time points coincide in the example of FIG. 6 thereby providing uninterrupted use of the instance by the customer.

At STOP2, the instance terminates because the variable price is determined at or near STOP2 to be higher than the bid price. The resource instance manager 180 continues to periodically re-evaluate the spot block request until the valid to time is reached. At 418 along the timeline (which precedes the valid to time), the resource instance manager 180 again determines that the variable price is equal to or lower than the bid price and starts a new spot block 424. The spot block time provided in the request extends the expiration point for spot block 424 past the valid to time. The instance continues to run even after the valid to time, but the resource instance manager 180 will not evaluate the spot block request at or near the end of spot block 424 because the valid to time 420 has already occurred.

In the example of FIG. 7, an initial spot block 430 is created after the valid from time because the variable price is equal to or less than the bid price. Spot block 430 terminates without a renewal due to the variable price exceeding the bid price as determined at or near the end of the spot block 430. Another spot block 432 is created as shown because eventually the variable price falls below the bid price. Spot block 432 terminates without a renewal because the variable price has again exceeded the bid price.

FIG. 8 shows an example in which an initial spot block 440 is created when the variable price is equal to or less than the bid price. Spot block 440 is serially renewed twice as spot blocks 444 and 448 because at or near the end of spot blocks 440 and 444 the variable price is equal to or less than the bid price. Spot block 448 terminates because at or near the end of its spot block time, the variable price is greater than the bid price. A period of time 449 then elapses in which the variable price exceeds the bid price and thus no spot blocks are created by the resource instance manager 180 during that time. At 451, however, the resource instance manager 180 again creates a spot block 450 for the customer because the variable price at that time equals or is less than the bid price. The spot block 450 terminates at the end of its spot block time without a renewal because the variable price exceeds the bid price as shown.

Figure 9:
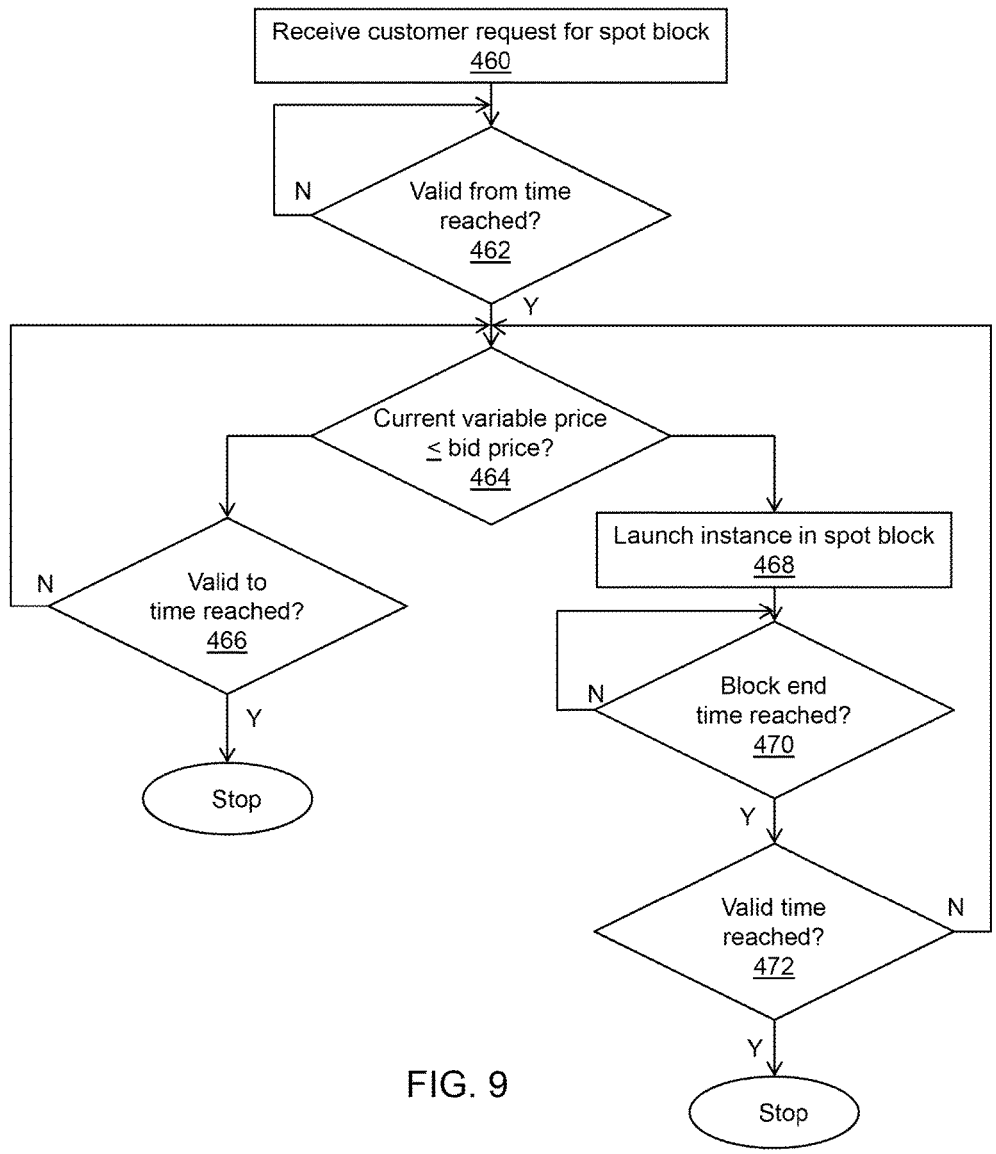
FIG. 9 shows another method for generating spot blocks taking into account valid from and valid to times in accordance with various examples.

FIG. 9 shows a method in accordance with various embodiments. The various operations depicted can be performed in the order shown, or in a different order. Further, two or more of the operations may be performed in concurrently rather than sequentially as shown. The operations may be performed by the resource instance manager 180.

At 460, the method includes receiving a customer request for a spot block. The request may be received from the customer via the interface manager 183 of the resource instance manager 180. The request may be provided in the form of a HyperText Markup Language (HTML) file or other suitable form. The request may include various parameters pertaining to the customer's desire for a spot block. Such parameters may include the number of instances to be launched in a spot block, the length of time of the spot block, the bid price, the types of instances (not specifically shown in the user interface example of FIG. 2), a "valid from" time, a "valid to" time, one or more availability zones, one or more regions (not shown in FIG. 2), end of block options such as persistent, all-or-nothing, etc.

At 462, the method includes determining whether the valid from time has been reached. The resource instance manager 180 will not launch a spot block until at least the valid from time has been reached. If the valid time has been reached, then at 464 the resource instance manager 180 determines whether the current variable price is less than or equal to the bid price. If the current variable price is greater than the bid price, then at 466 resource instance manager 180 further determines whether the valid to time has been reached. If the valid to time has not been reached, then control loops back to 464 for another comparison of the variable price relative to the bid price (e.g., at periodic time intervals). If the valid to time has been reached, the process stops as no more spot blocks can be created at the point.

If, however, the current variable price is equal to or less than the bid price, then the resource instance manager 180 launches one or more spot instances in the spot block newly created for the customer. In some embodiments, the spot instances may be launched automatically by the resource instance manager 180. In other embodiments, an alert may be provided to the customer announcing that a spot block has been reserved for the customer and that the customer can manually launch a spot instance in that block. The customer then can manually launch a spot in the spot block by submitting a suitable application programming interface (API) to launch the instance, or interacting with a user interface generated by the interface manager 183 of the resource instance manager 180.

The method further includes determining whether the spot block end time has been reached. The spot block may last from 1-6 hours in some embodiments, and thus the resource instance manager 180 determines when the end of that 1-6 hour block of time has been reached. When it is determined that the end time has been reached, the resource instance manager 180 then determines whether the valid to time has been reached. If it has not, then control loops back to the determination 464 for another evaluation of the spot block request to again determine if a new spot block can be launched. If the valid to time has been reached, then no more spot blocks can be created and the process stops.

Figure 10:
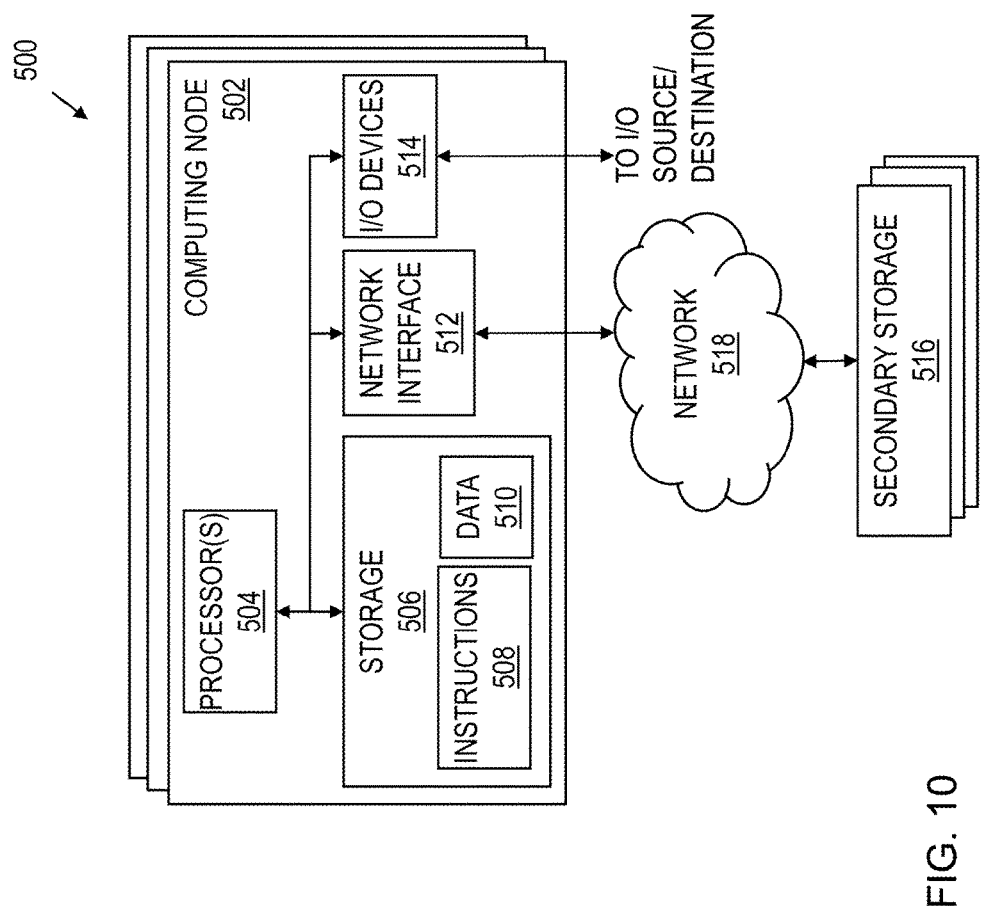
FIG. 10 is a block diagram illustrating an example computing device that may be used in some embodiments.

FIG. 10 shows a schematic diagram for a computing system 500 suitable for implementation of the web services platform 102, including the functionality to create and use cotenant policies and trust scores as described herein in accordance with various embodiments. The system includes one or more computing nodes 502. The computing system 500 includes the computing nodes 502 and secondary storage 516 communicatively coupled together via a network 518. One or more of the computing nodes 502 and associated secondary storage 516 may be used to provide the functionality of the resource instance manager 180 including the interface manager 183, the resource management database 191, and the price service 193.

Each computing node 502 includes one or more processors 504 coupled to memory 506, network interface 512, and I/O devices 514. In some embodiments, a computing node 502 may implement the functionality of more than one component of the system 100. In various embodiments, a computing node 502 may be a uniprocessor system including one processor 504, or a multiprocessor system including several processors 504 (e.g., two, four, eight, or another suitable number). Processors 504 may be any suitable processor capable of executing instructions.

For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the web services platform 102, each of the computing nodes 502 may implement the same ISA, or individual computing nodes and/or replica groups of nodes may implement different ISAs.

The storage 506 may include a non-transitory, computer-readable storage device configured to store program instructions 508 and/or data 510 accessible by processor(s) 504. The storage 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage 506. For example, instructions 508 may include instructions that when executed by processor(s) 504 implement the resource instance manager 180 including the interface manager 183 and/or other components of the service provider's network disclosed herein such as the resource management database 191 and the price service 193.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing nodes 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing node 502 for execution by a processor 504 by transmission media or signals via the network 518, which may be a wired or wireless network or a combination thereof. Each of the resource instance manager 180 (including interface manager 183), the resource management database 191, and the price service 193 may be implemented as separate computing nodes 502 executing software to provide the computing node with the functionality described herein. In some embodiments, the resource instance manager 180 (including the interface manager 183), the resource management database 191, and the price service 193 may be implemented by the same computing node.

The network interface 512 may be configured to allow data to be exchanged between computing nodes 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing nodes 502. Multiple input/output devices 514 may be present in a computing node 502 or may be distributed on various computing nodes 502 of the system 500. In some embodiments, similar input/output devices may be separate from computing node 502 and may interact with one or more computing nodes 502 of the system 500 through a wired or wireless connection, such as over network interface 512.

Those skilled in the art will appreciate that computing system 500 is merely illustrative and is not intended to limit the scope of embodiments. In particular, the computing system 500 may include any combination of hardware or software that can perform the functions disclosed herein, including computers, network devices, internet appliances, PDAs, wireless phones, pagers, etc. Computing node 502 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

What is claimed is:

1. A non-transitory computer-readable storage device storing instructions that, when executed on a computing system, cause the computing system to:
   for each of a plurality of block periods of time, perform a statistical analysis of usage data of resource instances in a first instance pool to estimate a number of resource instances from the first pool that are likely to be unused for the corresponding block period of time;
   for more than one of the block periods of time, assign the estimated number of resource instances from the first pool to an interruptible instance pool;
   receive a request for an interruptible resource instance from the interruptible instance pool having a variable cost value, wherein the request specifies a bid price, a block period of time during which the interruptible resource instance is to operate without regard to whether the variable cost value exceeds the bid price, and an end of block option;
   determine that the variable cost value equals or is less than the bid price;
   activate the interruptible resource instance on a physical server;
   operate the interruptible resource instance for at least the block period of time included in the request even if the variable cost value exceeds the bid price after launching the interruptible resource instance; and
   at an end of the block period of time, implement the end of block option from the request.

2. The non-transitory computer-readable storage device of claim 1, wherein the instructions, when executed on the computing system, cause the computing system, based on the end of block option, to:
   re-evaluate the request to determine whether the variable cost value is equal to or less than the bid price; and
   cause the interruptible resource instance to continue to operate for an additional block period of time.

3. The non-transitory computer-readable storage device of claim 1, wherein the request includes a valid from time and a valid to time, and wherein the instructions, when executed on the computing system, cause the computing system to:
   determine whether the variable cost value equals or is less than the bid price only from the valid from time to the valid to time; and
   cause the interruptible resource instance to continue to operate for additional block periods of time as long as the variable cost value is equal to or less than the bid price.

4. The non-transitory computer-readable storage device of claim 1, wherein, for each of a plurality of block periods of time, the instructions, when executed on the computing system, cause the computing system to estimate the number of resource instances from the first pool that are likely to be unused for the corresponding block period of time and according to a defined time schedule.

5. A system, comprising:
   a plurality of computing devices configurable to implement a plurality of resource instances of a provider network; and
   one or more computing devices configured to implement a resource instance manager and a pricing service;
   wherein the pricing service is operable to update and store cost values of resource instances; and
   wherein the resource instance manager is operable to:
      for each of a plurality of block periods of time, estimate a number of resource instances from a first pool that are likely to be unused for the corresponding block period of time;
      for at least one of the plurality of block periods of time, assign the estimated number of resource instances from the first pool to an interruptible instance pool;
      receive a request for an interruptible resource instance having a variable cost value, wherein the request specifies a bid price and a block period of time during which the interruptible resource is to operate without regard to whether the variable cost value exceeds the bid price;

obtain a current variable cost value of the interruptible resource instance from the pricing service;

determine that the variable cost value equals or is less than the bid price;

launch the interruptible resource instance from the interruptible instance pool on a physical server; and operate the interruptible resource instance for at least the block period of time included in the request even if the variable cost value exceeds the bid price after launching the interruptible resource instance.

6. The system of claim 5, wherein the resource instance manager is operable to:

re-evaluate the request to determine whether the variable cost value is equal to or less than the bid price; and cause the interruptible resource instance to continue to operate for an additional block period of time.

7. The system of claim 5, wherein, for each of the plurality of block periods of time, the resource instance manager is operable to:

estimate the number of resource instances that are likely to be unused for the corresponding block period of time according to each of different confidence values; and for the at least one block period of time and confidence value, assign the estimated number of resource instances from the first pool to the interruptible instance pool.

8. The system of claim 5 wherein the request includes a number for how many resource instances are to be operated in the block period of time, the number being greater than 1, an all-or-nothing indicator, and wherein the resource instance manager is operable to:

launch the number of interruptible resource instances based on the variable cost value being equal to or less than the bid price and the all-or-nothing indicator indicating that no interruptible resource instance is to be launched unless the number of interruptible resource instances are all available to be launched in compliance with the request.

9. The system of claim 5, wherein the one or more computing nodes are configured to implement a user interface to provide an entry field to receive a length of the block period of time, an entry field to receive a number of resource instances to be operated in the block period of time, and an entry filled to receive an end of block option; and wherein the resource instance manager is operable to cause the number of resource instances to be operated in the block period of time based on the current cost value being equal to or less than the bid price and to perform the end of block option at the end of the block period of time.

10. The system of claim 9, wherein the end of block option includes termination of the instance at the end of the block period of time.

11. The system of claim 9, wherein the end of block option includes, near the end of the block period of time, a determination that the current cost value is equal to or less than the bid price and a renewal, without interruption, of the interruptible resource instance for an additional block period of time.

12. The system of claim 11, wherein the end of block option permits only one renewal of the interruptible resource instance.

13. The system of claim 11, wherein the end of block option causes multiple renewals of the interruptible resource instance for additional block periods of time based on the current variable cost value being equal to or less than the bid price as determined near the end of each respective block period of time.

14. The system of claim 5, wherein the resource instance manager is operable to:

for more than one of the block periods of time, assign the estimated number of resource instances from the first pool to the interruptible instance pool.

15. A method, comprising:

for each of multiple block periods of time, estimating a number of unused resource instances during that particular block period of time;

assigning resource instances to an interruptible pool of resource instances based on at least one of the estimated numbers of unused resource instances;

receiving a request for a plurality of interruptible resource instances that are priced according to a variable spot cost value, wherein the request specifies a bid price and a block period of time during which the interruptible resources are to operate without regard to whether the variable spot cost value exceeds the bid price;

obtaining a current spot cost value of the interruptible resource instance;

determining that the current spot cost value equals or is less than the bid price; and activating from the interruptible pool at least one of the interruptible resource instances on a physical server for at least the block period of time included in the request even if the variable cost value exceeds the bid price after launching the interruptible resource instance.

16. The method of claim 15 wherein assigning resource instances to the interruptible pool of resource instances includes assigning resource instances to the interruptible pool of resource instances based on at least one of the estimated numbers of unused resource instances and based on planned outages of resource instances.

17. The method of claim 15 wherein activating the at least one of the interruptible resource instances on the physical server includes:

receiving an indication that no interruptible resource instances are to be activated unless all of the plurality of interruptible resource instances can be activated within the block period of time with the current spot cost value being equal to or less than the bid price, and activating all of the interruptible resource instances.

18. The method of claim 15, further comprising terminating the least one interruptible resource instance upon completion of the block period of time.

19. The method of claim 15, further comprising:

near the end of the block period of time, determining that the current spot cost value equals or is less than the bid price; and renewing, without interruption, the at least one interruptible resource instance for an additional block period of time.

20. The method of claim 15, further comprising, upon completion of the block period of time, converting a purchasing mode for the at least one resource instance to a purchasing mode that includes a fixed cost value.

* * * * *